No. 661,611. Patented Nov. 13, 1900.
A. W. KING.
WHEEL.
(Application filed Feb. 12, 1900.)
(No Model.)
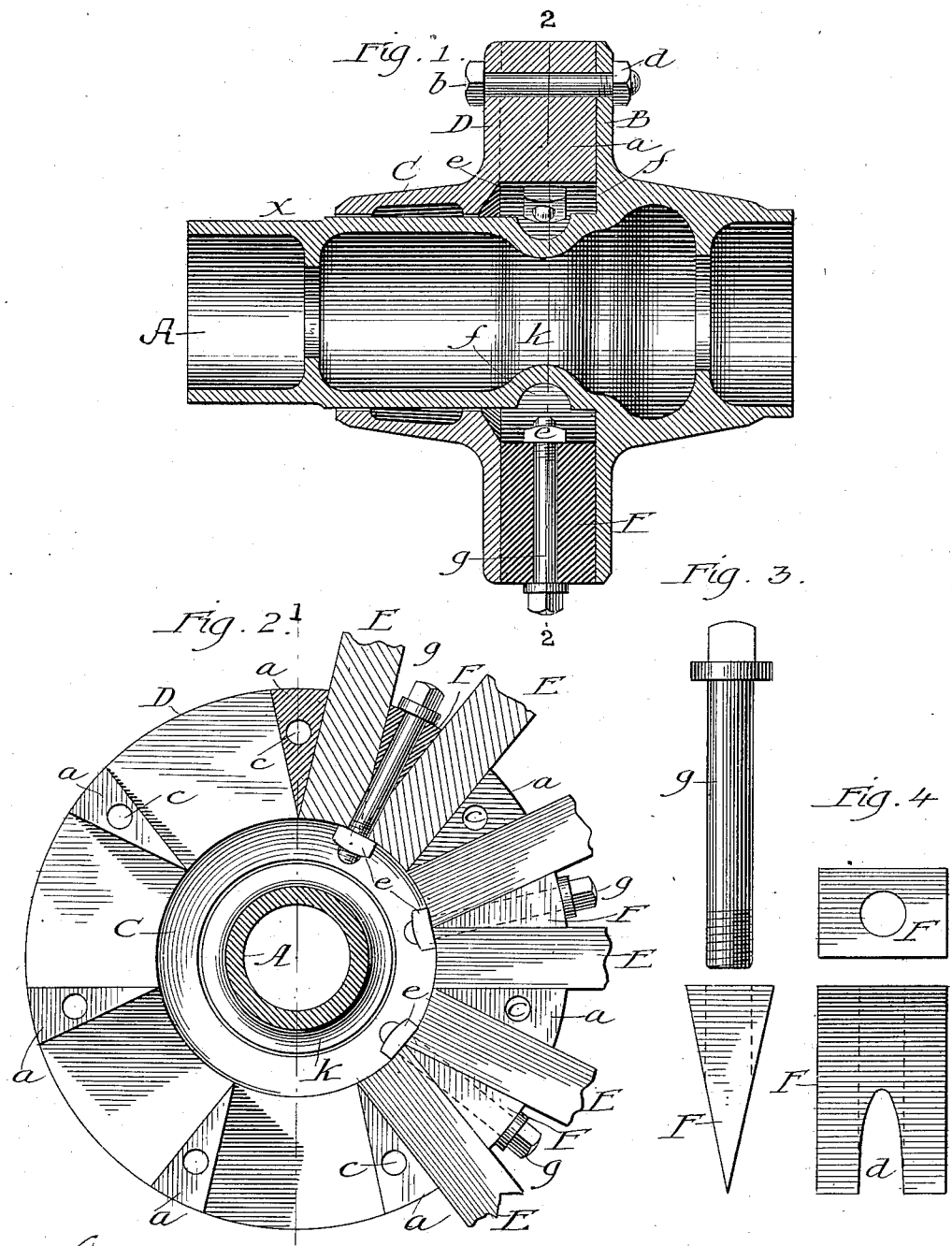
Witnesses:
Frank S. Blanchard
M. Friel.
Inventor:
Albert W. King
By Frank D. Thomason
Attorney.

UNITED STATES PATENT OFFICE.

ALBERT W. KING, OF CHICAGO, ILLINOIS.

WHEEL.

SPECIFICATION forming part of Letters Patent No. 661,611, dated November 13, 1900.

Application filed February 12, 1900. Serial No. 4,946. (No model.)

*To all whom it may concern:*

Be it known that I, ALBERT W. KING, a citizen of the United States, and a resident of Chicago, in the county of Cook and State of Illinois, have invented certain new and useful Improvements in Wheels, of which the following is a full, clear, and exact description, reference being had to the accompanying drawings and to the letters of reference marked thereon.

The object of my invention is to secure the inner ends of the spokes of a wheel in the hub in such manner that they are capable of resisting both lineal and transverse strains and can be separately removed from or installed in their sockets or tightened without affecting the remainder of the wheel structure any further than separating the two parts of the hub. This I accomplish by the means hereinafter fully described and as particularly pointed out in the claims.

In the drawings, Figure 1 is a longitudinal central section through the hub of my improved wheel, taken on dotted line 2 2, Fig. 2. Fig. 2 is a longitudinal central section through the hub of my improved wheel, taken on dotted line 1 1, Fig. 1. Fig. 3 is a side view of the radially-adjustable tightening-wedge used in connection therewith with its companion bolt above the same. Fig. 4 shows a top and a side view, respectively, of said wedge.

My invention comprises an elongated thimble-skein A, the exterior of which from its inner end for about two-thirds of its length is substantially cylindrical, and this cylindrical portion $x$ terminates at the base of an outwardly-projecting circumferential flange B. The exterior of the skein, between the flange B and the outer end thereof, is preferably made to conform to the design of the outer portion of the hub of a common wheel; but, as will be perceived from the subsequent description of my invention, the exact design of the outer portion of the skein or the exact location of the flange B between the ends of the hub or the length of the cylindrical portion thereof is immaterial. I employ in conjunction with this skein a sleeve C, the inner portion of which has its exterior conform to the shape of the inner portion of the hub of a common wheel and is designed to slip over and fit upon the inner cylindrical part of the skein A. The end of this sleeve C nearest the flange B is provided with a circumferential flange D, preferably of the same diameter as the first-named flange, which has projecting longitudinally therefrom toward flange B a series of wedge-shaped spacing-lugs $a\ a$, the projection of which corresponds to the thickness of the inner ends of the spokes E. These spacing-lugs are arranged at equal intervals apart, and the angle of the plane of their radially-disposed converging sides corresponds to the plane of the longitudinal side of the inner end of the radially-arranged spokes placed against them, thus bringing their thin edges or apexes nearest the center of the hub in a radial plane striking midway between their outer angles. This sleeve is secured to the flange B by bolts $b$, extending through transverse openings $c$ in said lugs and through a suitable hole in said flange B alining therewith. Nuts $d$ are screwed onto the outer threaded ends of the bolts to tighten the same.

There are just twice as many spokes in the wheel as there are lugs $a$, and when assembling the said spokes the inner ends of two of the same are placed between each lug and the lug on each side thereof, said spokes being of such thickness that when their inner ends are placed flat against the side of the lug nearest it and moved inward into proper position their inner ends will come together at about a point midway between the apexes of any two of said lugs $a$, about as shown. When thus arranged, the spokes will project from the hub at equal distances apart and in a radial plane. In order to confine them in this position, a series of independent radially-adjustable wedges F are employed corresponding in number to the lugs $a$ and of substantially the same form and dimensions thereas, only unattached. These wedges F are driven or forced radially inward between the inner ends of each pair of spokes placed between each adjoining pair of lugs and are retained in such position by the gage-bolts $g$, that extend in a radial plane through the longitudinal opening $d$, traversing the center of each wedge, and have the nuts $e$ on their inner ends. As shown, the outer ends of the lugs $a$ are flush with the circumferential edges of the flange D, and when in proper position the outer wider ends of the wedges will be in about the same circumferential plane.

The extent to which the inner ends of the spokes are inserted in the hub and the length in a radial direction of both lugs $a$ and wedges F are such as to leave an annular chamber $f$ between their inner extremities and the cylindrical portion $x$ of the skein, within which when the wheel is assembled nuts $e$ are confined. If the length of the bolts $g$ required it in order to accommodate their inner ends, a circumferential groove $k$ might be made in the cylindrical portion of the skein in the same transverse plane of said bolts when sleeve C was secured to flange B.

In assembling a wheel embodying my improvements the inner ends of the spokes are first seated between the lugs $a$ of the sleeve C in the manner hereinbefore explained, and then the wedges are driven radially between the same. Bolts $g$ are then inserted through the longitudinal opening in the wedges and forced between the extremities of the spokes separated thereby, whereupon nuts $e$ are screwed onto their inner ends and tightened to draw the wedges radially inward, and thereby compress each spoke between the same and the lug $a$ on the opposite side of said spoke. Should there be any slight difference in the width of the inner ends of the spokes, the wedges will automatically adjust themselves as they are thus drawn toward the center of the hub to accommodate such difference and at the same time securely clamp the spokes in their proper relative positions. When the spokes are thus secured in position, the sleeve is slipped over the cylindrical portion of the skein until the ends of the lugs $a$ come in contact with flange B, whereupon the bolts $b$ and nuts $d$ are used, as hereinbefore stated, to fasten the sleeve to flange B of the skein and to compress and hold the inner ends of the spokes securely between the flanges.

If desired, the lugs $a$ might be made to project from the flange B of the skein instead of the flange D of the sleeve. In this event, as will be readily seen, there would be no difference involved in the principles of construction of the improvements hereinbefore described. It is also obvious that the practical application of my invention does not necessitate the making of the wedges F or equivalent thereof of the shape and dimensions shown, nor does it require that the wedges should be given a radial movement in order to secure the spokes in place, although I prefer such a construction. If desired, bolts $g$ may be placed so that their heads would be innermost and the nuts $e$ thereof on the outer ends. The effect of their manipulation would be just the same as when the nuts were on the inner ends of said bolts. In fact any change in the construction of the parts of the hub as hereinbefore described and illustrated, so long as two circumferential flanges are employed which have the space between them divided into recesses for the reception of the inner ends of the spokes and in which a radially-adjustable wedge or its equivalent is used to secure the said spokes between the same and the ends or radially-disposed sides of the said recesses, I consider as coming within the spirit of my invention.

What I claim as new is—

1. A hub having two circumferential flanges separated longitudinally of the hub, and stationary spacing members arranged between said flanges, in combination with a series of spokes, and movable holding members arranged between the spokes to force the same against the stationary members and secure them in such position.

2. A hub having two circumferential flanges separated to receive the spokes, stationary tapered spacing members between said flanges, dividing the space between the flanges into a series of compartments each adapted to receive a plurality of spokes in combination with the spokes and radially-adjustable tapered spacing members arranged between the spokes to secure the same in radial position between the stationary and movable members.

3. A hub having circumferential separable flanges, one of which has a series of lugs projecting from its face toward the opposing flange, in combination with a series of spokes, and a series of radially-adjustable wedges between which and said lugs the spokes are secured.

4. A hub having separable circumferential flanges, one of which has a series of lugs, projecting therefrom toward the opposing flange, in combination with a series of spokes arranged radially in pairs with the exterior faces of the butts of each pair in contact with the adjacent faces of an opposing pair of lugs, a series of wedges, each arranged between the interior faces of a pair of spoke-butts, and radially movable toward the axis of the hub to force the spokes against the lugs.

5. A hub having a pair of circumferential flanges and stationary lugs carried thereby, in combination with a series of spokes, a series of wedges between which and the said lugs the butts of the spokes are secured, bolts extending longitudinally through said wedges, and nuts on the inner ends of said bolts for adjusting said wedges radially.

6. A hub comprising a thimble-skein having a circumferential flange integral therewith, and a sleeve fitting over one end of said skein and having a circumferential flange opposed to the flange on the skein, one of said flanges being provided with a series of integral lugs projecting therefrom toward the opposing flange, in combination with a series of spokes, and a series of radially-movable wedges between which and the said lugs the inner ends of the spokes are secured, and means for uniting the skein and the sleeve.

7. A hub comprising a thimble-skein having a circumferential flange integral therewith, a sleeve fitting over one end of said skein having a circumferential flange thereon opposed to the flange on the skein and provided with a series of integral lugs projecting laterally
5 therefrom toward the opposing flanges, and means for uniting said lugs with the opposing flange, in combination with a series of spokes, a series of movable wedges arranged between said spokes, and means for adjusting said wedges radially to secure the spokes between 10 said wedges and the lugs.

ALBERT W. KING.

Witnesses:
FRED. J. MASON,
C. P. BURDICH.